(12) United States Patent
Dotterweich et al.

(10) Patent No.: US 10,466,669 B2
(45) Date of Patent: Nov. 5, 2019

(54) PRODUCTION MACHINE OR MACHINE TOOL AND METHOD FOR OPERATING A PRODUCTION MACHINE OR MACHINE TOOL

(71) Applicant: Siemens Aktiengesellschaft, München (DE)

(72) Inventors: Bernd Dotterweich, Erlangen (DE); Markus Gross, Fürth (DE); Oswald Käsdorf, Grossenseebach (DE); Michael Von Der Bank, Puschendorf (DE)

(73) Assignee: Siemens Aktiengesellschaft, München (DE)

( * ) Notice: Subject to any disclaimer, the term of this patent is extended or adjusted under 35 U.S.C. 154(b) by 464 days.

(21) Appl. No.: 14/934,929

(22) Filed: Nov. 6, 2015

(65) Prior Publication Data
US 2016/0132036 A1    May 12, 2016

(30) Foreign Application Priority Data
Nov. 7, 2014   (EP) .................................. 14192315

(51) Int. Cl.
*G05B 19/042*     (2006.01)

(52) U.S. Cl.
CPC ....... *G05B 19/0421* (2013.01); *G05B 19/042* (2013.01); *G05B 2219/25022* (2013.01)

(58) Field of Classification Search
CPC .............. G05B 19/0421; G05B 19/042; G05B 2219/25022
See application file for complete search history.

(56) References Cited

U.S. PATENT DOCUMENTS

| 5,363,026 A | 11/1994 | Currat |
| 6,381,239 B1 * | 4/2002 | Atkinson ............. H04M 3/005 370/362 |

(Continued)

FOREIGN PATENT DOCUMENTS

| CN | 101297249 A | 10/2008 |
| CN | 201174047 Y | 12/2008 |

(Continued)

OTHER PUBLICATIONS

Yang H. et al. 'An Open CNC System based on Switched Ethernet; Networking Sensing and Control; 2010 International Conference on; IEEE; pp. 684-688; XP031674571; ISBN: 978-1-4244-6450-0; 2010.

(Continued)

*Primary Examiner* — Mark A Connolly
(74) *Attorney, Agent, or Firm* — Henry M. Feiereisen LLC

(57) ABSTRACT

An automated machine wherein messages exchanged between components of the machine are forwarded to at least one component at a first time point that temporarily stores them and from that component to a central unit at a second time point is disclosed. Said first time point preceding said second time point within the framework of a cycle time of the automated machine. The time points are determined relative to that cycle time and provided to respective components in conjunction with a startup of the automated machine. The component temporarily storing messages forwards them in the manner of a layer-3 switch. This message forwarding is driven by the respective time points, rather than event-driven, can operate seamlessly in existing systems wherein communications are time-slot controlled, and decouples the components so that real-time communications within the machine can be optimized.

17 Claims, 7 Drawing Sheets

(56) References Cited

U.S. PATENT DOCUMENTS

| | | | | |
|---|---|---|---|---|
| 2002/0131451 | A1* | 9/2002 | Franke | G05B 19/4185 370/493 |
| 2004/0100929 | A1* | 5/2004 | Garcia-Luna-Aceves | H04W 72/1278 370/338 |
| 2009/0106504 | A1* | 4/2009 | Skerlj | G06F 13/1673 711/154 |
| 2009/0323708 | A1* | 12/2009 | Ihle | G06F 13/28 370/402 |
| 2011/0296056 | A1* | 12/2011 | Choi | G06F 13/4234 710/6 |

FOREIGN PATENT DOCUMENTS

| | | |
|---|---|---|
| CN | 203350672 U | 12/2013 |
| DE | 102006040417 A1 | 8/2007 |
| EP | 1916578 A1 | 4/2008 |

OTHER PUBLICATIONS

Menga Justin "CCNP Practical Studies: Layer 3 Switching"; Cisco Press; XP002739448;; 2003.

* cited by examiner

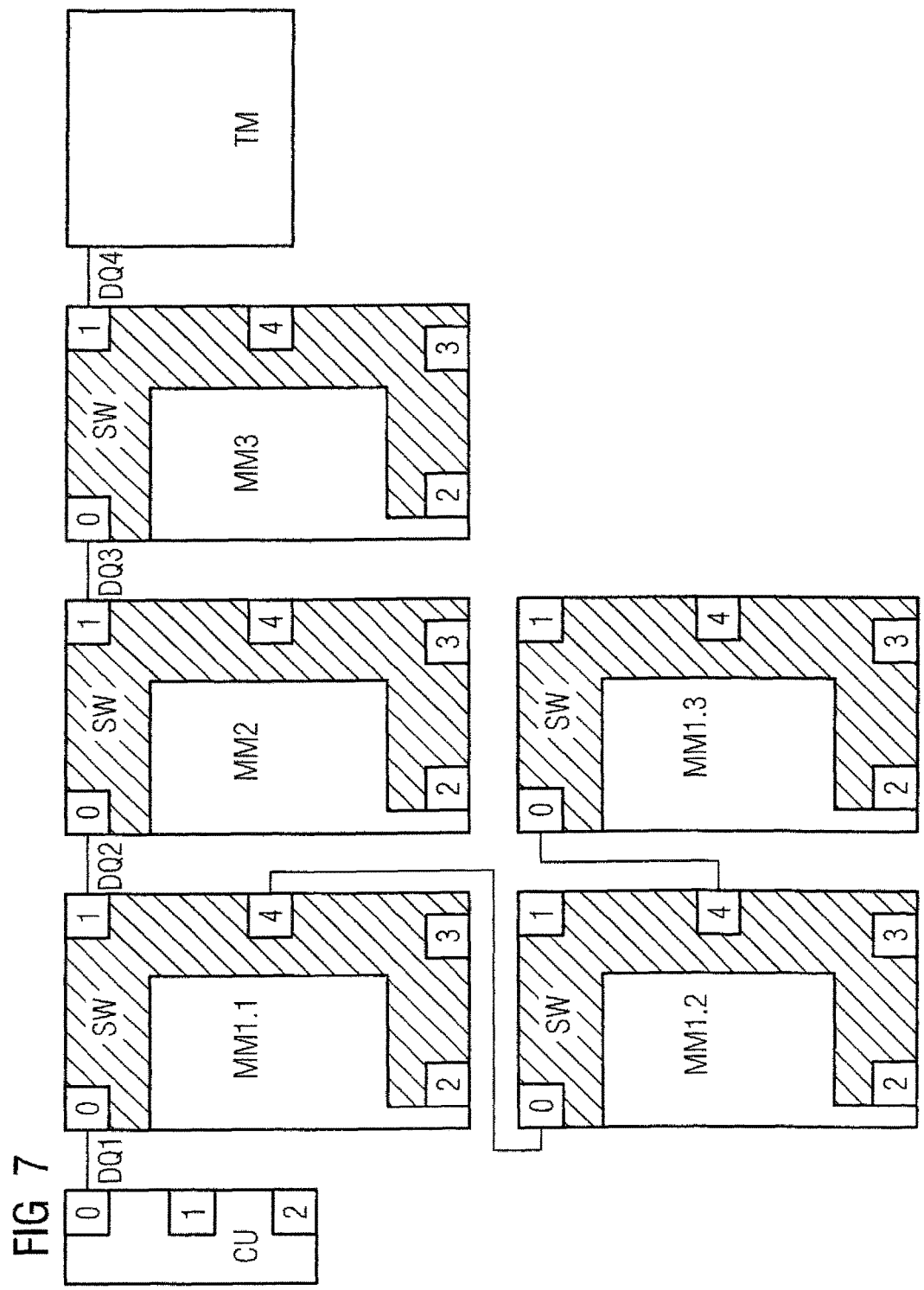

PRODUCTION MACHINE OR MACHINE TOOL AND METHOD FOR OPERATING A PRODUCTION MACHINE OR MACHINE TOOL

CROSS-REFERENCES TO RELATED APPLICATIONS

This application claims the priority of European Patent Application, Serial No. 14192315.1, filed Nov. 7, 2014, pursuant to 35 U.S.C. 119(a)-(d), the disclosure of which is incorporated herein by reference in its entirety as if fully set forth herein.

BACKGROUND OF THE INVENTION

The invention relates to a program-controlled automated machines, and a method for the operation of such a machine. In particular, the invention relates to a production machine or machine tool, such as a program-controlled automation system having an industrial robot.

The following discussion of related art is provided to assist the reader in understanding the advantages of the invention, and is not to be construed as an admission that this related art is prior art to this invention.

Production machines and machine tools, referred to herein as "machines", for short, are known per se. A printing machine is one example of a production machine. The term "machine tool" is conventionally used in mechanical engineering and toolmaking to refer to all machines used for processing workpieces with tools, among other things, especially the so-called "NC" or "CNC" numerically-controlled machines. It is well-known that an industrial robot is a programmable universal machine that is intended and equipped for processing and handling workpieces, and/or for their assembly.

In the case of machines of the type mentioned in the introduction, real-time communication is required between the components which they incorporate, for example communication between the drive components for axis drives or the like, and network nodes that function as a layer-3 switch are also known.

The conditions that must be satisfied in the context of real-time communication are particularly strict. Usually the cycle times, that is, the reaction times, are 250 µs or 125 µs. In individual cases, cycle time as short as 31.25 µs can be provided and needed. Any infringement of the cycle/reaction time criteria referred to below as the "cycle time" for short, will inevitably result in the invalidity of the transmitted data concerned. Infringements of the cycle time must also be monitored. The usual tolerances lie at a low multiple of 100 ns.

The cycle time is relevant not only for communication, but for the entire system of the machine concerned. A machine with several axes incorporates, as the drive components, several so-called "motor modules", each having a power component. One or several sensors is/are assigned to each motor module. In what follows, the motor modules and the sensors are referred to individually and collectively as "components". For a machine with several axes, and correspondingly several components, the following steps must be completely worked through in succession within the cycle time:

1. Detection and processing of the measured values in the components
2. Transmission of the measured values over the network to a central unit of the machine concerned
3. On the basis of the measured values, calculation of new set-point values by means of the central unit (for example in the form of the execution (calculation) of control algorithms)
4. Transmission of the set-point values over the network from the central unit to the components
5. Processing and application of the new set-point values in the components In what follows, reference will also be made to these steps, using their numbering, as "Step 1", "Step 2" etc. The communication relationships which are used/which result refer not only to the individual motor modules (MM) but also to the units incorporated in the motor modules, for example sensors in the form of so-called motor measurement systems (MMS) and direct measurement systems (DMS). An implication of this—in respect of the cycle time—is that a relative number of components require correspondingly as many transmissions with comparatively small data volumes.

These requirements can only be met by a so-called time-slot method. Such a time-slot method is basically known per se. With it, in the start up of the machine concerned the exact communication requirements within the machine are determined, and each individual transmission is precisely planned with respect to a time point relative to the cycle time (time-slot). In operation, this plan is then simply processed cyclically. Each component then "knows" exactly where the previously planned time-slots lie for its own messages which are to be sent, and it always sends them exactly at the appropriate time points. This sending takes place even then when the prerequisites may not be present, for example because data items, in particular locally recorded measured values, are not yet available. The result of this "time-slot" monitoring mentioned above is that data items marked as invalid are sent.

In the time-slot method, the sending of messages presumes an exact synchronization of all the components. All the components thus work using a common time base. This is effected via synchronization messages and digital Hs. The tolerances for isochronicity are mostly less than 50 ns.

Although the sending of messages in the time-slot method is an established and proven technique, there are in practice certainly still some problems. Thus, a network with its components connected for communication purposes often includes areas with conditions which are mechanically or electrically more difficult. One example of such more difficult mechanical conditions is trailing cables. An example of conditions which are made electrically more difficult is strong interfering fields. In such areas, the fault-free rate of data acquisition which can be achieved is limited. In addition, in a network links are often required between areas with dangerous voltages and areas with low voltages, wherein safe physical contacts must be possible. Because of the high voltage-proof galvanic isolation which is then required, high data rates are unreasonably expensive for these links. Finally, the large number of different components normally does not permit all the components to be provided with the latest network technology. Even in facilities which are being newly configured, components with different versions of the network technology must often communicate with each other. This also often leads to different data rates in parts of the network.

Apart from this, one special requirement on communication arises in the case when power components are connected in parallel. The compensation which is then necessary for unavoidable differences in the behavior of these power components can be effected in hardware (inductances) and in software (compensation regulator). The higher the performance of such a compensation regulator, the smaller the inductances' dimensions can be. However, an additional prerequisite for high-performance compensation regulation is that the communication between the motor modules of the power components involved goes far beyond the usual level of such requirements. This results in an additional load on the communication network.

SUMMARY OF THE INVENTION

A production machine or machine tool, together with a method for operating such a machine in accordance with the invention can particularly efficiently meet those communication needs. A production machine or machine tool in accordance with the invention, also referred to below as a machine for short, has a plurality of components connected together in a network. The components have real-time communication links between each other and a predetermined cycle time. The machine has at least one layer-3 switch configured to temporarily store messages received from another component, and to forward a temporarily stored message at a time point which is prescribed or can be prescribed relative to a cycle time of the machine, and a time base generator. The time base generator is configured to determine that time point relative to the predetermined cycle time in a startup of the machine and provide that time point to the component.

A machine of the type mentioned above incorporates a plurality of functional units, for example motor modules, terminal modules, sensors etc., here referred to generally as components, connected together in a network for real-time communication having a prescribed cycle time. The components have direct or indirect communication links with each other, at least one of the components functioning as a layer-3 switch that temporarily stores an incoming message in an internal memory and later forwards it at a prescribed time point.

In a method of operation of an automated machine of the type mentioned in the introduction, the components exchange messages with each other as real-time communication within the framework of the prescribed cycle time. The messages are forwarded, either directly or indirectly, to a central unit in the automated machine and at least one of the components temporarily stores messages received from other components and forward temporarily stored messages at a time point that is prescribed relative to the cycle time.

The time point for the forwarding of the temporarily stored messages is determined in the context of any previous allocation of time points in accordance with a time-slot method and is issued to the component concerned in conjunction with a startup of the machine. Each component that provides temporary storage is then controlled by the time-slot method.

The invention advantageously provides temporary storage and subsequent forwarding of temporarily-stored messages that decouples components of the automated machine. A component in the machine that stores incoming messages temporarily and then forwards the temporarily-stored messages at a later time point within the framework of a cycle time of the machine, can be generically referred to as a temporarily-storing component. However, it is generally referred to, though not limited to, a "layer-3 switch" herein, thereby using an example of a temporarily-storing component from current conventional technology.

The temporarily-storing component together with other components of the machine that are directly or indirectly connected to it, form a subnet within the communication network, "the network" for short, in which all the components connected together therein are essentially independent of other components not connected to the temporarily-storing component. It is unimportant here whether the further components incorporated in such a subnet are also temporarily-storing components or not.

What is important is that the communication of messages from a temporarily-storing component to the central unit of the machine takes place at a fixed point in time relative to the cycle time. Thus the temporarily-storing component does not forward messages in response to events, as when messages are sent because an incoming message is received, but rather at a transmission time point when a message can be forwarded that has a fixed definition that is defined in accordance with the familiar methods of time-slot communication—the temporarily-storing component is not event-controlled, but rather time-slot-controlled. The temporarily-storing component thus fits seamlessly into time-slot message transmission methods currently used within many conventional machines of the type mentioned above. In particular, the use of at least one temporarily-storing component provides an improved, advantageous communication net for drive systems, by satisfying time-slot communication needs without placing additional loads on other parts of the network required for communications with the remaining components within the machine.

In a particular embodiment of the invention, the components are linked directly or indirectly with each other in a tree structure that is linked with a central unit of the automated production machine or machine tool, wherein at least the component that is directly linked to the central unit, through which there is an indirect link to the central unit for the other components, functions as a temporarily-storing component, such as a layer-3 switch for example.

If the component that is directly linked to the central unit functions as a temporarily-storing component then that entire network, excluding the central unit, operates as a subnet, independent of the central unit. The temporarily-storing component can, for example, combine incoming and temporarily-stored messages together, whether individual messages or all temporarily-stored messages stored therein, and communicate them to the central unit at the prescribed time point. By combining several messages it is possible to make optimal use of the bandwidth of the communication link between the central unit and the temporarily-storing component directly linked to it. The data rate for this link can be significantly higher than the data rate of individual links between the components, for example, or higher for all links between the components in that subnet. Other temporarily-storing components can be connected to a temporarily-storing component that is directly linked to the central unit. This produces further subnets having a hierarchy corresponding to the sequence of the temporarily-storing components originating at the central unit and extending outward from it. For each subnet, there is the advantage of decoupling and the advantage of the possibility of combining temporarily-stored messages together.

In a further embodiment, the components are again linked to a central unit of the machine in a tree structure, but the component that is directly linked to the central unit does not necessarily function as a temporarily-storing component. Instead, a component that is not linked directly with the central unit functions as the temporarily-storing component of the subnet. The components that are linked to this temporarily-storing component that is not linked directly with the central unit may, for example, be motor modules of power components which are connected in parallel within the machine. The advantage of this embodiment is that, communication within the subnet is independent of limitations imposed on the rest of the network. For example, as is necessary in some of the scenarios sketched in the introduction, power components in the machine are parallel-connected and the subnet enables real-time communications therein to be processed independent of the real-time communications occurring in the overall network. Thus, real-time communications in the subnet can satisfy more stringent boundary conditions than can be satisfied by real-time communications in the overall network.

In an embodiment of the method of operating an automated machine in accordance with the invention, one component of the automated machine forwards a message to a temporarily-storing component of the automated machine at a first time point. The temporarily-storing component receives and temporarily stores messages from other components and then forwards the temporarily-stored messages at a second time point within the framework of the cycle time that is prescribed relative to the cycle time.

The automated machine in accordance with the invention incorporates a plurality of components having direct or indirect communication links between each other, wherein the components exchange messages with each other within the framework of a real-time communication cycle time at a time point that is prescribed or can be prescribed relative to the cycle time and wherein the messages are sent either directly or indirectly to a central unit which is incorporated in the machine. At least one of the components temporarily stores messages received from another component and forwards a temporarily stored message at time point which is prescribed relative to the cycle time. By temporarily storing and later forwarding of a temporarily-stored message at a given prescribed time point relative to a cycle time prescribed for real-time communications, the temporarily-storing component fits in with existing real-time communications in the automated machine that are controlled in accordance with the time-slot method, because the time point at which the message is forwarded is prescribed and fixed, as it is for the time-slot method.

In a particular embodiment of the invention, the temporarily-storing component combines several temporarily-stored messages together and then forwards the combined messages at a later point in time that is prescribed relative to a communications cycle time of the machine. The temporarily-storing component still fits seamlessly into the previous concept of real-time communication in accordance with the time-slot method when forwarding such combined messages. With the combined temporarily-stored messages, pauses that are otherwise always present between individual messages communicated using the time-slot method disappear. By the combination of several messages, the cycle time is optimally utilized and the result is that within the same cycle time it is possible to communicate more payload data, or to communicate additional messages.

Advantageously, in accordance with the invention, a message is forwarded to a temporarily-storing component at a first time point relative to the cycle time and from the temporarily-storing component at a different, second time point relative to the cycle time, these two transmitting time points being centrally planned at a given time, at the initial startup time of the machine, for example. The first sending time point for the sending of the message to the relevant temporarily-storing component together with a second sending time point for the forwarding of the temporarily-stored data items by the temporarily-storing component are subject to the boundary condition that the first sending time point occurs before the second sending time point within the framework of the communications time cycle applicable to their communication network. In this way, the communications within the communication network of the machine concerned can be centrally planned in their entirety so that adherence to severe real-time conditions is possible and the forwarding of the temporarily stored data items at the second time point, which is independent of the first sending time point, fits seamlessly into the machine's existing real-time communications that are carried on in accordance with the time-slot communication control method, each temporarily-storing component being operated using the time-slot control.

Advantageously, the temporarily-storing component that participates in the communication network of any of the types of machines mentioned in the introduction and that has or can have a communication link with other components of the same machine in accordance with the invention has an internal memory for temporarily storing at least payload data items from an incoming message and a processing unit, such as a microprocessor, configured so as to monitor a prescribed time point or several prescribed time points at which respective temporarily-stored data items can each be forwarded at their respective prescribed time point and are forwarded at their respective prescribed time point.

This functionality of the components in forwarding messages that is described above is preferably implemented in software. Thus embodiments of the invention include a computer program with program code instructions that can be executed by a microprocessor or the like, and on the other hand a storage medium with a computer program of this type, that is a computer program product with program code means, and finally also a temporarily-storing component, for example a motor module of a production machine or machine tool that has a memory in which such a computer program is loaded or can be loaded so that the carries out the method of the invention described and claimed herein.

BRIEF DESCRIPTION OF THE DRAWINGS

Other features and advantages of the present invention will be more readily apparent upon reading the following description of currently preferred exemplified embodiments of the invention with reference to the accompanying drawing, in which:

FIG. 7 shows a communication network in accordance with the invention having components incorporated by a production machine or machine tool that has power components connected in parallel.

DETAILED DESCRIPTION OF PREFERRED EMBODIMENTS

Figure 1:
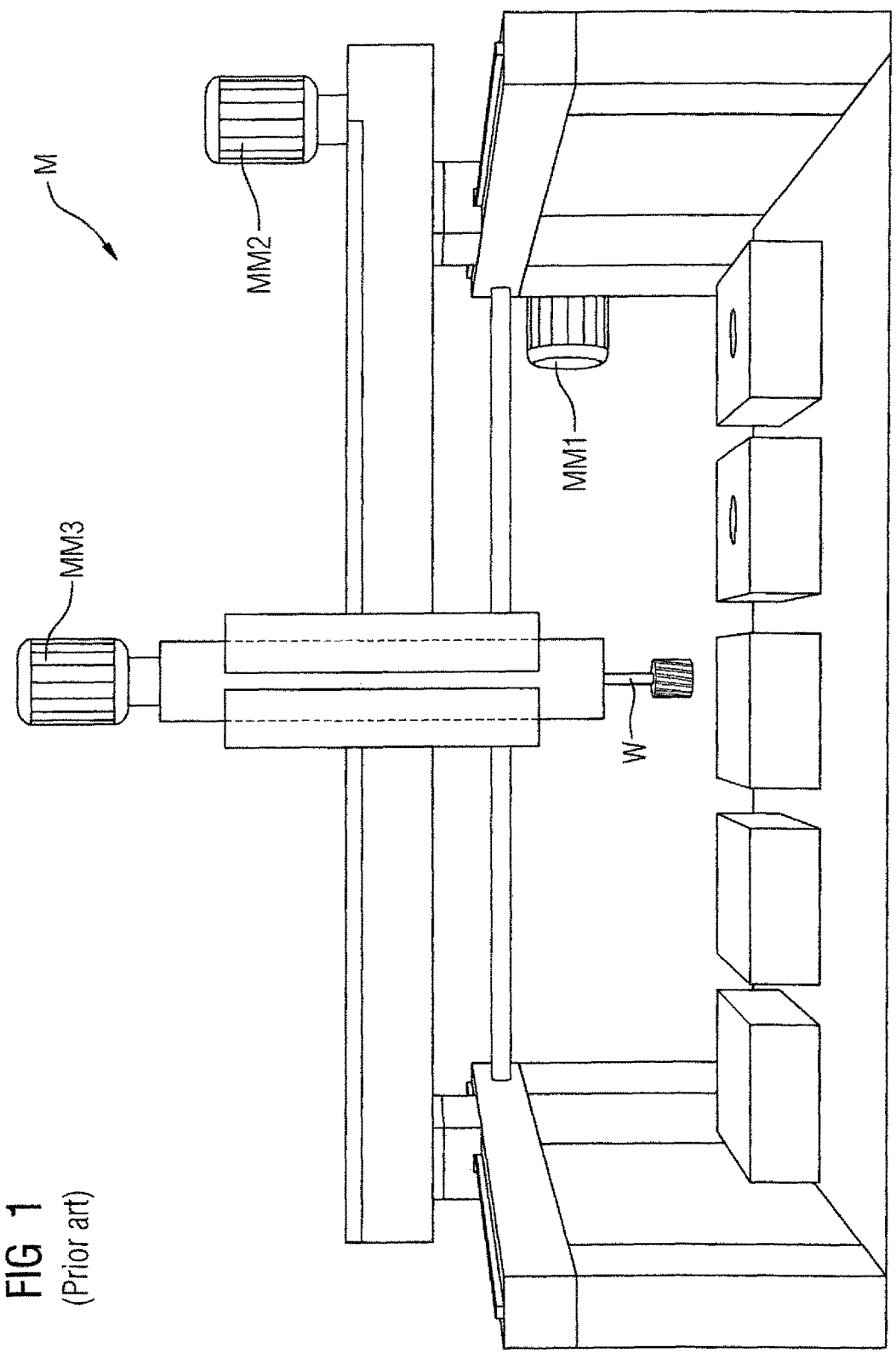
FIG. 1 shows a conventional production machine or machine tool.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an example of a production machine or machine tool a facility, referred to below for short as a machine M, wherein three drive units, motor modules MM1, MM2, and MM3. These motor modules MM1-MM3 and the power components which they incorporate, not identified separately here, move a tool holder W, in the machine M, in the x-direction, the y-direction and the z-direction, as is known in the art.

In the exemplary embodiment shown, each drive of the motor modules MM1-MM3 actuates a threaded shaft, and a respective slider is guided in a linear movement by the threaded shaft, in each case, in a manner which is known per se. In this way a movement is possible which—relative to the direction of viewing from which the diagram in FIG. 1 is shown—is an up and down movement of the tool holder W (z-direction; third motor module MM3), a movement to the right and the left of the tool holder W (y-direction; second motor module MM2), and a backward and forward movement of the tool holder W (x-direction; first motor module MM1). The invention itself, however, is not in any way restricted to the kinematics of the machine M, which is shown in the diagram in FIG. 1 is expressly to be understood as only an example and as an illustration for assisting the reader in visualizing such a machine M and the plurality of motor modules MM1-MM3 incorporated therein.

When the machine M is being operated, a coordinated actuation of the individual motor modules MM1-MM3 is necessary for coordinated movement of the tool holder W. For this, a central unit CU (FIG. 2), which is not shown in FIG. 1, is provided in the known way. The central unit CU actuates the individual motor modules MM1-MM3, in a way which is again basically known per se, corresponding to a relevant processing or parts program. In doing this, the central unit CU processes measured values from the machine M (Step 1) and on the basis of these determines—usually making use of control algorithms—setpoint values for the individual motor modules MM1-MM3 (Step 3).

Such measured values are recorded at the individual motor modules MM1-MM3 or by them, and are sent to the central unit CU (Step 2). The setpoint values are sent by the central unit CU to the relevant motor module MM1-MM3 (Step 4). For the purpose of sending such data items, messages are exchanged between the individual components (central unit CU, motor modules MM1-MM3 and the relevant sensors). For this purpose, the individual components have communication links with each other in the manner which is basically known per se and the basis for the communication linkage is formed, for example, by a bus system, to which the individual components are connected. Overall, this produces for the machine M concerned a communication network, referred to below as a network for short.

Figure 2:
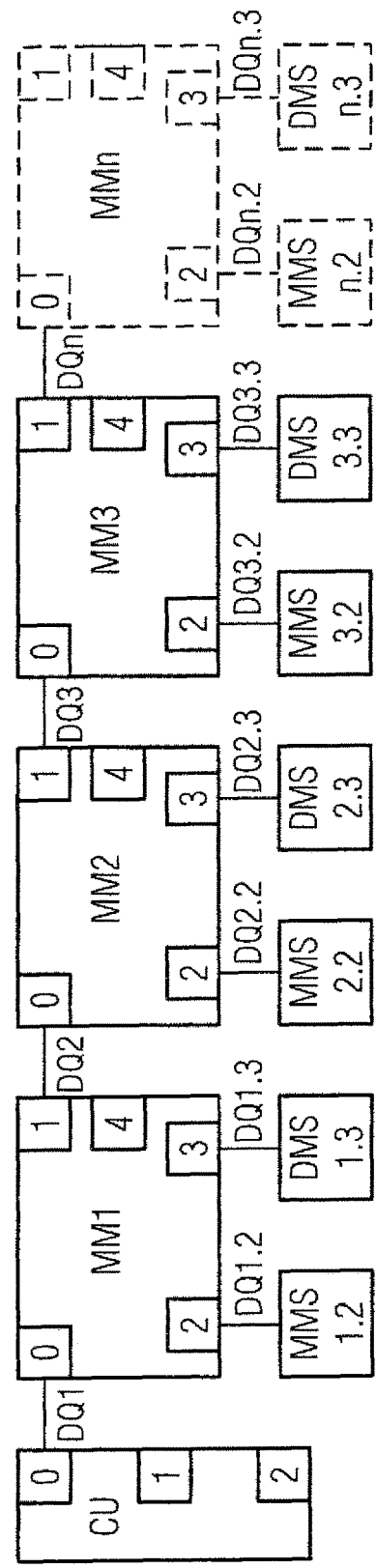
FIG. 2 shows individual components incorporated in a production machine or machine tool, together with a conventional communication network providing communication links between the components.

One example of such a network is shown in the diagram in FIG. 2. According to this, the network incorporates the central unit CU already mentioned together with individual motor modules MM1-MM3, MMn. Each motor module MM1-MM3, MMn incorporates a power component, not shown separately, for example for the purpose of driving an axis, or such a power component is at least functionally assigned to each motor module MM1-MM3, MMn.

In the case of the machine M shown in FIG. 1, the network incorporates exactly three motor modules, MM1-MM3. The diagram in FIG. 2 shows, with its at least one further motor module MMn, that the network is not restricted to three motor modules MM1-MM3 and can incorporate a number, at least theoretically arbitrary, of motor modules MM1-MM3, MMn.

The digits shown by the individual components ("0", "1" and "2" at the central unit CU and "0", "1", "2", "3" and "4" at the motor modules MM1-MMn) represent the so-called ports of the components concerned. Connected to the ports are the connecting lines of the network. In this way, the first motor module MM1 is linked to the central unit CU. The second motor module MM2 is linked to the first motor module MM1, and through this is linked indirectly to the central unit CU. The third motor module MM3 is linked to the second motor module MM2, and through this and the first motor module MM1 is also linked to the central unit CU, etc.

As sensors, so-called motor measurement systems MMS and so-called direct measurement systems DMS are shown. These are in each case assigned functionally to a motor module MM1-MMn, and in each case are connected via a port to motor module MM1-MMn concerned. For the purpose of unambiguously identifying the individual measurement systems MMS, DMS, the abbreviations "MMS" or "DMS" respectively are assigned a first digit which identifies the motor module MM1-MMn concerned followed by a second digit which identifies the relevant port to which the measurement system MMS, DMS is connected. Accordingly, the abbreviated form DMS2.3 identifies a direct measurement system DMS, which is connected to the second motor module MM2 at its port 3.

The individual communication paths in the network are identified in the diagram with DQx and DQx.y, wherein "DQ" stands for so-called DRIVE-CLiQ links (DRIVE-CLiQ is, among other things, a German trade mark of Siemens AG which is registered under the registration number 30146056) for links which can, for example, be used within the network. Naturally, the approach presented here can also be considered for other communication links.

The structure of a network of the type shown by way of example in FIG. 2 is referred to as a tree structure, because starting from the central unit CU the motor modules MM1-MM3, MMn are connected together in a central communication path (DQ1, DQ2, DQ3 . . . DQn). To the motor modules MM1-MM3, MMn are connected, in a branch- or leaf-like manner, the sensors MMSx.y, DMSx.y. The central unit CU forms the roots of the tree structure.

Figure 3:
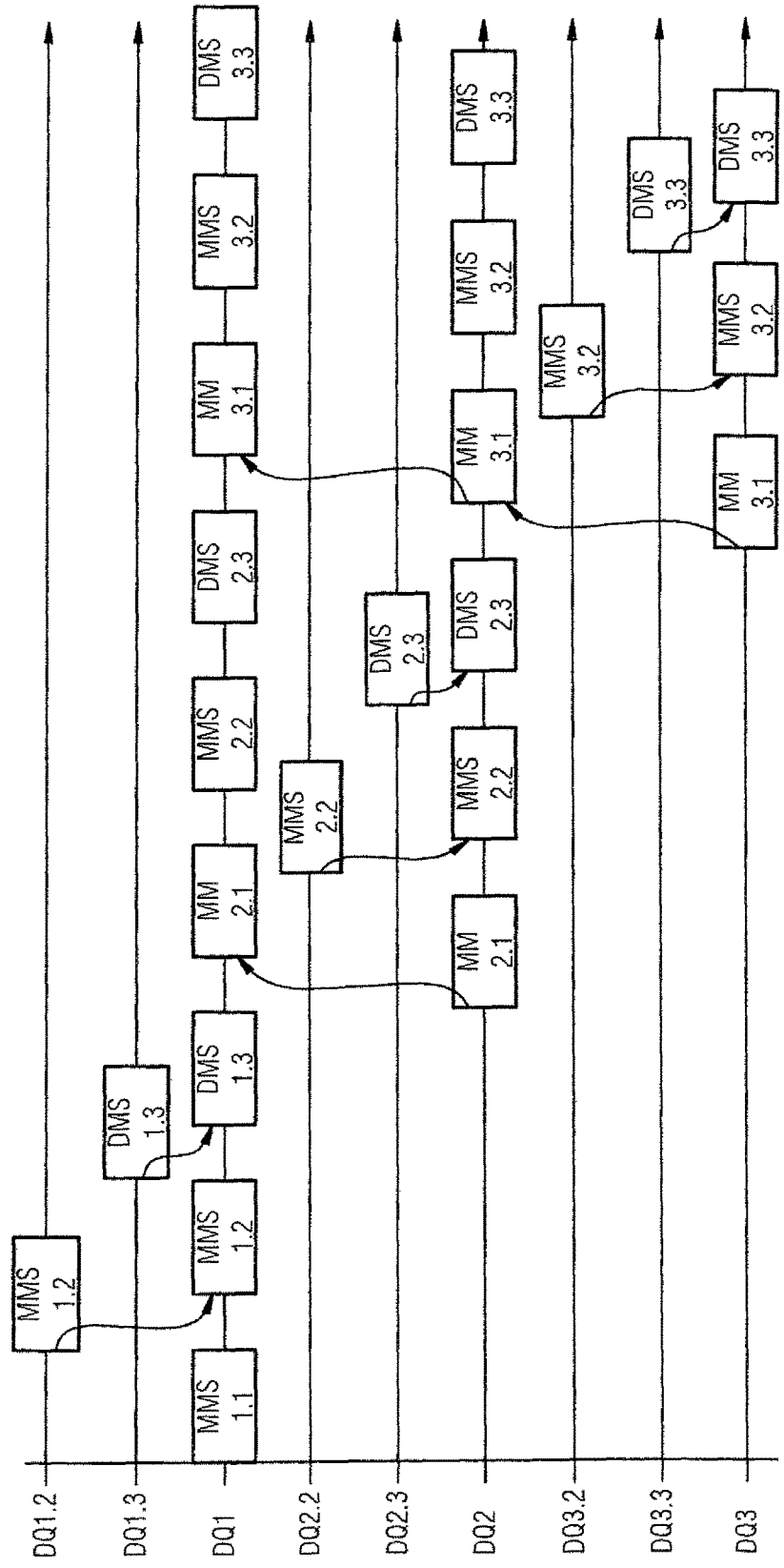
FIG. 3 shows a scenario for communication between the components in accordance with a conventional time-slot method.

For the network shown in FIG. 2, the diagram in FIG. 3 shows a communication in accordance with the familiar time-slot method. The rectangular boxes shown represent individual messages which are exchanged between the components of the network, wherein the text in each box identifies the sender of the message concerned. The messages are each assigned to individual horizontal lines— referred to below as time lines or briefly as lines—and these stand for the communication paths/links within the network (see FIG. 2), over which the message concerned is communicated. The horizontal direction shows the time.

The third line from the top is identified on the left as DQ1 and accordingly stands for the link between the first motor module MM1 and the central unit CU. On this line, messages are shown at regular intervals. These are the messages which are sent via the link DQ1 from the first motor module MM1 to the central unit CU. The regularly timed distribution of the messages is a result of the underlying time-slot communication and the starting time point for each message shown for the link DQ1 corresponds to the starting time point of a time-slot, previously defined by reference to the communication requirements in the overall system. Here, the global time-slot planning is effected by a component in the overall system which functions are the master, so for example the central unit CU.

During the step labeled in the introduction as Step 2, with the scenario shown communication accordingly takes place as follows: initially the first motor module MM1 sends data items to the central unit CU (message MM1 on the line DQ1). Later, the motor measurement system MM1.2 of the first motor module MM1 sends data items via the link DQ1.2 to the first motor module MM1 (message MMS1.2 on the line DQ1.2). This is forwarded to the central unit CU by the first motor module MM1 in accordance with the time-slot provided for it (message MMS1.2 on the line DQ1). The arrow between these two messages (and every further corresponding arrow) makes it clear that the payload data items are the same, and the timing gap between the starts of sending of the two messages corresponds to the throughput time for the data through the component concerned, in this case the throughput time through the motor module MM1. Here, the items of data are copied bit- or byte-wise from the input port concerned to the relevant output port. Here, there is no temporary storage of the payload data items within the motor module MM1, and it is also not necessary.

Yet later, the direct measurement system DMS1.3 of the first motor module MM1 sends data items via the link DQ1.3 to the first motor module MM1 (message DMS1.3 on the line DQ1.3). This too is forwarded from the first motor module MM1 to the central unit CU in accordance with the time-slot provided for it by bit- or byte-wise copying of the incoming data items to the relevant output port (message DMS1.3 on the line DQ1).

For the remaining motor modules MM2-MMn this applies correspondingly. In addition there is the fact that in each case the data items MMSx.y, DMSx.y sent by the measurement systems MMSx.y, DMSx.y first go into the motor module MM2-MM3 concerned and from there are forwarded via the links to the preceding motor module concerned (shown for the links DQ2 and DQ3) as far as the central unit CU. The data items from messages coming in to a motor module MM1, MM2 from another motor module MM2, MM3 are here also forwarded by bit- or byte-wise copying to the relevant output port, that is, with no temporary storage.

The scenario sketched out above applies correspondingly for the step identified in the introduction as Step 4, with the difference that the central unit CU functions as the sender and the motor modules MM1-MM3 together with their sensors MMSx.y, DMSx.y are the receivers of the messages concerned. The communication in Step 2 takes place—after the detection and processing of the measured values in the components (Step 1)—at the start of each cycle. The communication in Step 4 takes place shortly before the end of each cycle, and after this, immediately before the end of the cycle, the processing and application of the new setpoint values takes place in the components (Step 5).

Figure 4:
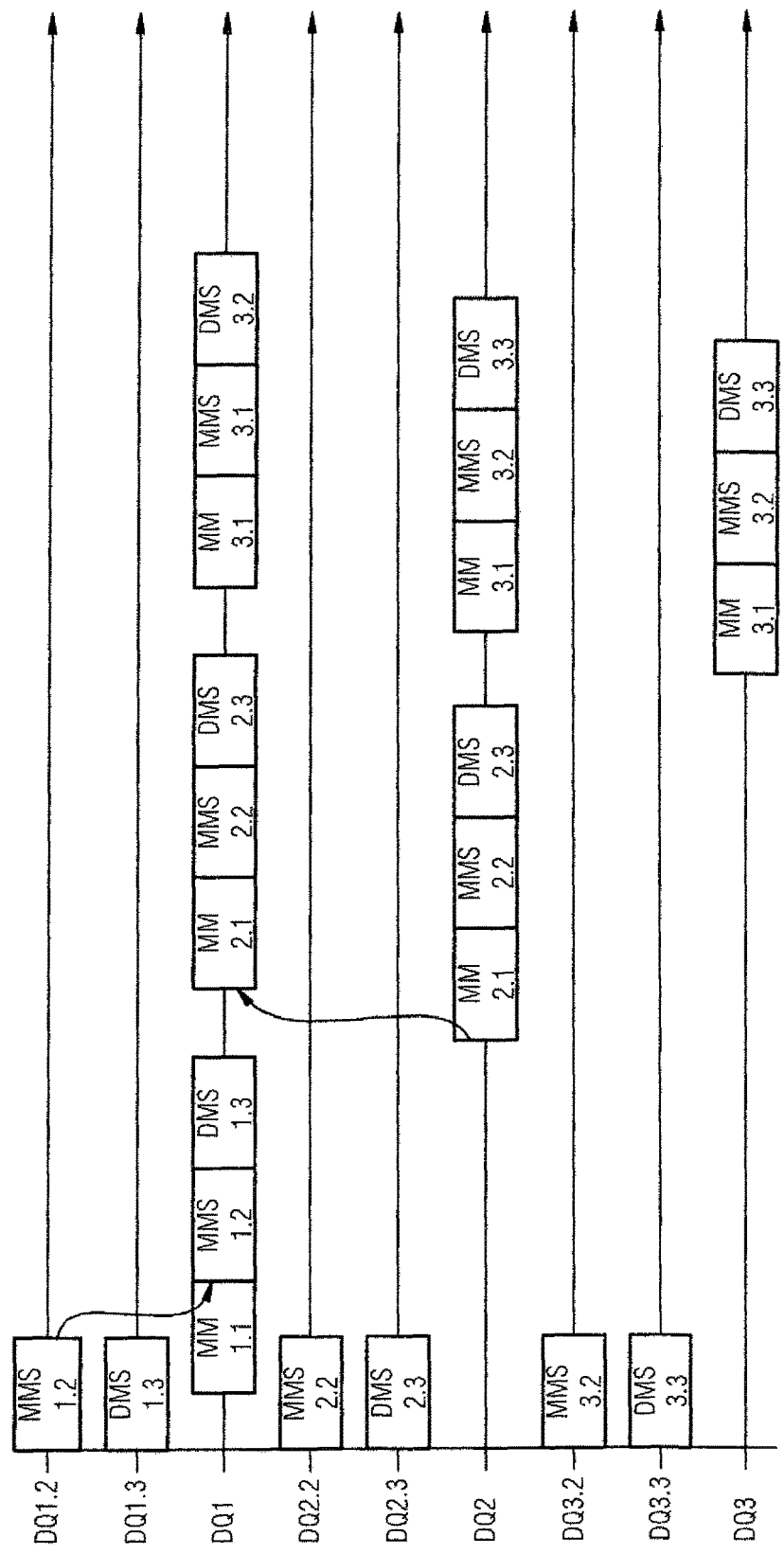
FIG. 4 shows a scenario for communication between the components in accordance with the invention.

The diagram in FIG. 4 shows, for the same network, the situation which arises when, in accordance with the invention, the approach presented here is used. The diagram in FIG. 4 again shows (as in FIG. 3) the communications which take place in the framework of the communication of data items to the central unit CU in the second step, and in every cycle there is appended shortly before the end of the cycle an appropriate outgoing communication from the central unit CU for the purpose of communicating the set-point values to the components (Step 4; not shown).

The messages sent by the measurement systems MMS, DMS to the motor module MM1-MM3 concerned can in principle be sent at arbitrary time points, provided that it is ensured that each message comes into the relevant motor module MM1-MM3 before the time point at which the forwarding of the received data items by the motor module MM1-MM3 is intended. For the sake of simplicity in the relationships, the diagram in FIG. 4 shows a simultaneous sending of the messages from the measurement systems MMSx.y, DMSx.y.

The special aspect of the approach presented here is that each motor module MM1-MM3 stores temporarily an incoming message and forwards a temporarily stored message at a later point in time. The motor module MM1-MM3 thus functions in the network as a temporarily-storing component. The functionality of temporary storage and later sending of incoming data items is in principle known per se as a so-called layer-3 switch. Accordingly the temporarily-storing component is also referred to below as a layer-3 switch, or also for short as simply a switch SW—although, because the function of a layer-3 switch can also go beyond the temporary storage which is required here, without forgoing any further-reaching general validity.

Figure 5:
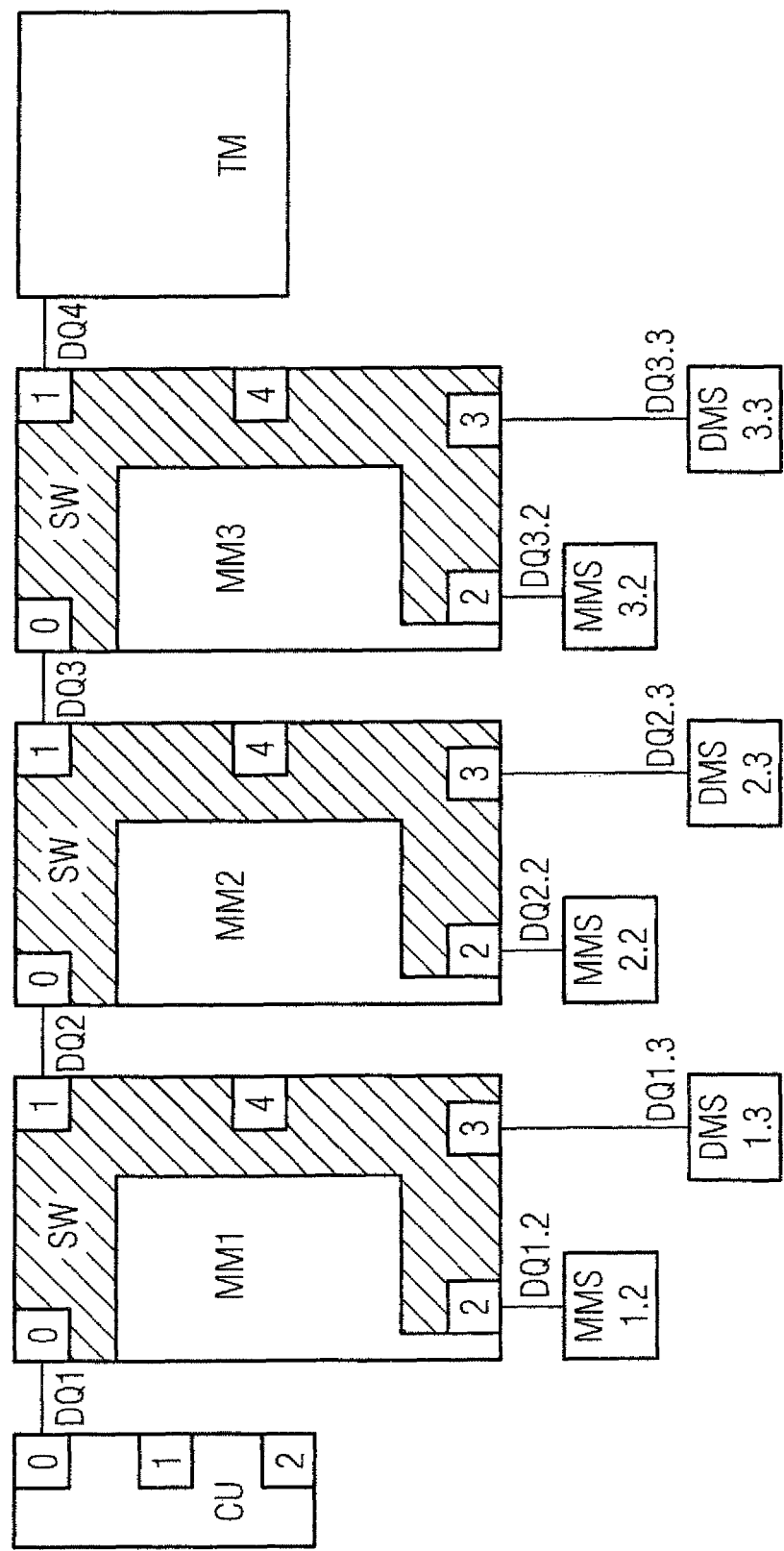
FIG. 5 shows a communication network similar to that shown in FIG. 2 wherein the approach proposed here is used, in accordance with the invention.

In the diagram shown in FIG. 5, the essentials of the exemplary network shown in FIG. 2 are repeated for the purpose of illustration. However, in FIG. 5 each motor module MM1-MM3 also has a switch SW that incorporates the ports 0 to 4. Provision can also be made for a motor module MM1-MM3, MMn to have at least one more port, which is not assigned to the switch SW. The diagram in FIG. 5 does not show the fact that the central unit CU can also have such a switch. The above formulation, according to which each motor module MM1-MM3, MMn functions as a temporarily-storing component (as a layer-3 switch) is to be understood as meaning that the motor module MM1-MM3, MMn either incorporates (as shown schematically in simplified form in FIG. 5) such a layer-3 switch SW or that such a layer-3 switch SW is assigned to the motor module MM1-MM3, MMn. As an example of a component with an earlier version of the network technology, a terminal module TM is also shown.

Figure 6:
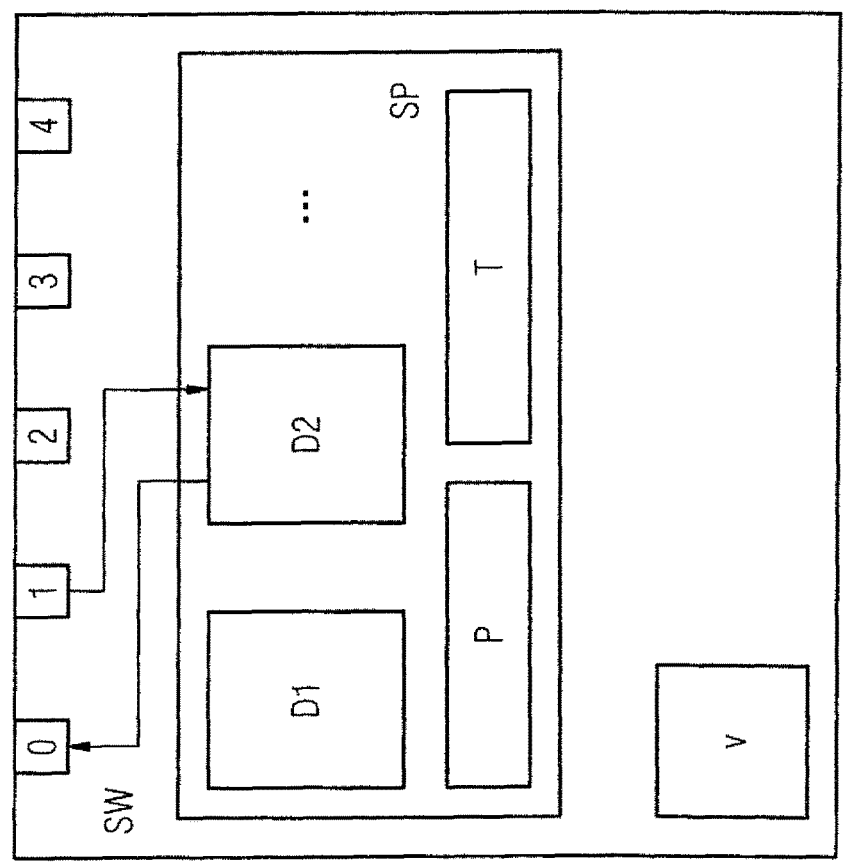
FIG. 6 shows an example of a temporarily-storing component, such as a "layer-3 switch"

The diagram in FIG. 6 shows, in a schematically simplified form, a switch SW. Apart from a number of input and output ports, this incorporates a memory SP for storing temporarily at least the payload data items from incoming messages, and for the later forwarding of this. For the purpose of simplifying the description, the assumption is made that the switch SW has a processing unit V in the form of or in the nature of a microprocessor, and that when the switch SW is operating it executes a computer program P which is loaded in the memory, wherein the computer program P determines the functionality of the switch SW. In practice, it can be assumed that the processing unit V and the computer program P are combined in the form of firmware or firmware and hardware, so that the mention of a computer program P and a processing unit V are not to be interpreted restrictively.

The data items D1, D2, that is at least the payload data items in incoming messages are stored in the memory SR When the temporarily stored items of data D1, D2 are later forwarded, the same data area in the memory SP is read out. The arrows which are shown by way of example and emanate from one of the ports (input port) and point to one of the ports (output port) are here intended to indicate that incoming data items are written successively into a relevant data area D1, D2 and, during the later forwarding, outgoing data items are read out, again successively, from the data area concerned. The arrows shown are here to be understood as being in the nature of so-called write/read pointers, wherein each pointer addresses the storage location concerned in the memory SP and the applicable data area D1, D2, to which a current write or read operation relates. The time point at which received data items D1, D2 are automatically forwarded by means of the switch SW is externally prescribed to the switch SW, for example by the central unit CU. For this purpose, at least one time value T is written into the memory SP, this being monitored by means of the processing unit V under the control of the computer program P. When the time point, defined relative to the cycle time by the time value T, is reached, the switch SW automatically initiates the forwarding of the data items concerned via the relevant output port. The switch SW can administer and monitor a plurality of time values T of this type.

Returning to the diagram in FIG. 4, the function of a motor module MM1-MM3, MMn (also) as a layer-3 switch SW means accordingly, with respect to the first motor module MM1, that the data items received from the measurement systems MMS1.2, DMS1.3 at port 2 or port 1 respectively via the links DQ1.2 and DQ1.3 are initially stored temporarily in the switch SW and are then forwarded at a prescribed fixed sending time point. This prescribed fixed sending time point (see FIG. 6: time point T) is (as in the situation in FIG. 3) set on the basis of a time-slot plan for the overall system and a resulting fixed time-slot.

The same applies for the remaining motor modules MM2-MMn with the difference that their data items are once again in each case sent, after internal temporary storage and combination, via the link DQ2, DQ3 to the relevant preceding motor module MM1, MM2, until they eventually come in at the first motor module MM1. This sends the data items received to the central unit CU, in conformity with the time-slot plan and the resulting fixed time-slot.

Comparing the communication scenario in FIG. 4 with the communication scenario in FIG. 3, based on the known time-slot method, it is seen that with the approach proposed here (FIG. 4, FIG. 5) the result is a smaller number of time-slots. In the case of the example shown, the result is three time-slots, namely a first time slot for the message sequence MM1, MMS1.2, DMS1.3, a second time-slot for the message sequence MM2, MMS2.2, DMS2.3 and a third time-slot for the message sequence MM3, MMS3.2, DMS3.3. By comparison, with the previous time-slot method in the same network, nine time-slots are required, namely a time-slot for each one of the messages MM1, MMS1.2, DMS1.3, MM2, MMS2.2, DMS2.3 and MM3, MMS3.2 and DMS3.3.

The switch SW is integrated into the network either as an additional component or as a supplementary function within an existing component, in particular within a motor module MM1-MM3, MMn. The tree structure of the network together with the central time-slot planning remain unaffected. The principle of time-slots determined by the master, that is for example the central unit CU, is enhanced with the switch SW. In this case, the switch SW works not on an event-driven basis but purely time-slot driven. The switch SW divides the network up into sub-networks, the time-slots for which are decoupled from each other. This solution also satisfies the real-time requirements sketched in the introduction. The switch SW, or every switch SW, must temporarily store every data packet in its entirety before it can forward it. Although this does increase the latency, it nevertheless results in the possibility of adapting the network significantly more flexibly to the special aspects of the drive network cited in the introduction.

In detail:

If a component of the machine M concerned, such as for example a motor module MM1-MM3, MMn, is to forward a message, for example a message from the connected sensors, two messages are planned. The message originating, for example, from the sensors (first message) should be received at a first time point t1 at one of the ports 1-4, for example at port 2. The message which is provided for forwarding these data items (second message) should be sent at a second time point t2 via another port, for example port 0. For these messages, the components then act at this point as a switch if t1<t2 and the data items, at least the payload data items, from the first message are used when the second message is sent. There is no actual dependence between the two messages, and this is established only indirectly through the data items concerned and the time monitoring of each individual message. The time points at which the two messages are communicated in the network are planned and fixed by a unit which is functioning as the master, such as for example the central unit CU, taking into consideration the required boundary conditions, here that t1<t2.

The temporary storage of the data items from a message in the switch SW and the independence of the time-slots in the sub-networks, allow several data packets from different components on branch links to be combined together into gap-free messages, without thereby giving up the autonomy of the data packets. This is shown in FIG. 4 by the combination of the messages on the links DQ1, DQ2 and DQ3. The elimination of the pause times between the messages results in a better utilization of the available data rate.

Subnetworks with different physical boundary conditions can be operated at different data rates.

Messages are only exchanged in the sub-networks in which they are actually required.

Finally, a message must only be "understood" within a relevant sub-network by all the components it incorporates. This permits the possibilities of the current network version to be fully exploited in each sub-network, while it is possible to communicate in other sub-networks using messages which are compatible with older network versions, as shown in the diagram in FIG. 5 with the terminal module TM. Because, as a layer-3 switch, the switch SW reconstructs for the layer 2, which is critical for compatibility, a message originating for example from the terminal module TM or from some other component with an earlier version of the network technology, it automatically converts the communication to the correct message format for the sub-network concerned.

In summary, it can thus be emphasized that with the approach presented here the familiar technology of a layer-3 switch SW is applied for the first time for the efficient handling of the special technical and physical aspects of communication between components of a machine M of the type mentioned in the introduction, or generally between drive components. Of particular importance here is the adherence to the tree structure of the network while at the same time satisfying the extreme real-time requirements. A ring-shaped network topology, such as is used in other high-performance real-time networks, is normally not possible in the case of drive components, because it is a technical condition of many components that they can only have one network connection.

The combination of tree topology, layer-3 switch SW and highly precise time-slots also makes it possible to use the switch SW in the sense of a serial-parallel conversion. In this case, the switch component, such as for example a motor module MM1-MM3 incorporating a switch SW, or some other component of the machine M concerned, collects or distributes the data packets from several drive components connected in parallel which, for example, due to special boundary conditions (see above: trailing cable, interfering fields, potential separation) do not permit high data rates. The data transmission between the switch SW, or the component with such a switch SW, and the central unit CU is effected at a high data rate in time multiplex over the link concerned. The use of a switch SW makes this possible without disruption to the unified structure of the communication network, unlike other solutions in the drive environment.

The switch SW also enables the data rate to be raised on those parts of the network which are not subject to any restriction of the type mentioned above, that is no restriction which brings with it a reduced data rate. The use of at least one switch SW thus represents a decisive step in raising the number of components in a drive network while maintaining the same cycle/reaction time.

The additional communication which is desirable for a parallel connection of power components is also possible without loading the rest of the network if the power components involved are combined together in a sub-network and are linked to the remainder of the network via a switch SW. For this situation, the diagram in FIG. 7 shows in a schematically simplified form two additional motor modules MM1.2, MM1.3 and it is to be assumed that their power components are operated in a parallel connection together with the power component of the motor module which is now labeled MM1.1 (so the parallel connection does not relate to the communication network). Because at least the motor module MM1.1 which is in the main branch (DQ1, DQ2, DQ3, . . . ) of the network functions as a temporarily-storing component (switch SW), the communications between the motor modules MM1.1, MM1.2, MM1.3 affected, which are required with such a parallel connection of the power components, can now take place independently of the communication in the overall network.

Although the invention has been illustrated and described in more detail by the exemplary embodiment, the invention is not restricted by the example or examples disclosed, and other variations can be derived from it by a specialist without going outside the scope of protection for the invention.

Individual prominent aspects of the description submitted here can thus be summarized briefly as follows: it specifies a production machine or machine tool M together with a method for the operation of such a machine M, wherein messages which are exchanged between components MM1-MM3, MMn, MMSx.y, DMSx.y of the machine M which have communication links between them, are temporarily stored by at least one component MM1-MM3, MMn, MMSx.y, DMSx.y. Accordingly the, or every, affected component MM1-MM3, MMn, MMSx.y, DMSx.y functions as a temporarily-storing component MM1-MM3, MMn, MMSx.y, DMSx.y and the temporarily stored data items are forwarded by these at a later point in time, which is fixed and prescribed to the temporarily-storing component MM1-MM3, MMn, MMSx.y, DMSx.y. The temporarily-storing component MM1-MM3, MMn, MMSx.y, DMSx.y accordingly works in the manner of a layer-3 switch SW. Incoming data items are stored temporarily and are later forwarded. However, the temporarily-storing component MM1-MM3, MMn, MMSx.y, DMSx.y here works not on an event-driven basis, but in each case driven purely according to the prescribed time point. As a result, the temporarily-storing component MM1-MM3, MMn, MMSx.y, DMSx.y can be used seamlessly in an existing time-slot controlled communication method, and effects a decoupling of the components MM1-MM3, MMn, MMSx.y, DMSx.y incorporated in the machine M concerned, and permits optimization of the real-time communications taking place within the machine M.

The invention has been described with reference to exemplary embodiments. These examples are not to be understood as a restriction on the invention. Rather, in the context of the present disclosure, it will be apparent to one skilled in the art that enhancements and modifications are also entirely possible. For example the combination or modification of individual characteristics or method steps described in the general or particular section of the description, the claims and/or the drawings, can be inferred by a specialist without departing from the spirit and scope of the invention.

In particular, instead of a computer program having individual program code instructions, the method described here and below can also be implemented in the form of firmware providing logical devices that are configured to implement the functions defined by the program code of the software. It will be clear to a specialist that instead of implementing a method in software, an implementation in firmware, or in firmware and software, or in firmware and hardware, is also possible. Therefore, the term software or the term computer program, as they are used herein also include such other implementation possibilities, in particular implementation of the invention in firmware, or in firmware and software, or firmware and hardware.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An automated machine having a plurality of components that are connected together in a network having a predetermined cycle time, each component including at least one sensor and a motor module, said components having real-time communication links between each other, said machine comprising:

a first temporary memory in a component, said first temporary memory having a switch, said switch being configured to temporarily store a message received by the first temporary memory, and to forward the received message at a first predetermined time point relative to said predetermined cycle time, and a time base generator circuit configured to determine said first predetermined time point relative to said predetermined cycle time in a startup of the machine and to provide said first predetermined time point to said first temporary memory to configure said a switch.

2. The automated machine of claim 1, further comprising a central unit having a plurality of components linked in a tree structure to said central unit, one component that is directly linked to said central unit providing an indirect link to the central unit for the other components in the tree structure, said component directly linked to the central unit providing said first temporary memory component.

3. The automated machine of claim 1, further comprising a central unit having a plurality of components linked in a tree structure to said central unit, one component that is directly linked to said central unit providing an indirect link to the central unit for the other components in said tree structure, one of the other components having a temporary memory and linking the rest of the other components in said tree structure to said component that is directly linked to said central unit in a subnet, said subnet being indirectly linked to and parallel to the central unit.

4. The automated machine of claim 1, wherein the component having the temporary memory provides a layer-3 switch.

5. The automated machine of claim 1, further comprising a processing unit in a component having a temporary memory, said temporary memory temporarily storing at least payload data from messages received by said component having said processing unit, said processing unit monitoring a time point relative to said cycle time of and providing a switch that forwards data from messages received by said component having the processing unit at a predetermined time point, relative to said cycle time.

6. A method of operating an automated machine having a plurality of components that are connected together in a network having a cycle time, said components each including at least one sensor and a motor module, and having real-time communication links between each other, said method comprising the steps of:

determining a first time point relative to said cycle time and providing said first time point to a first component of the automated machine having a first temporary memory in conjunction with a startup of the automated machine, forwarding a message stored in said first temporary memory to a second component as a real-time communication at said first time point, said message being forwarded either directly or Indirectly from said first component to a central unit in the automated machine, temporarily storing the message received from said first component in a second temporary memory in said second component, and forwarding said temporarily-stored message from said second temporary memory to said central unit at a second time point that is predetermined relative to said cycle time, said second time point being provided to said second component in conjunction with a startup of the automated machine.

7. The method of claim 6, further comprising the step of combining together several messages that are stored by said first temporary memory, and forwarding the combined message at said second time point.

8. The method of claim 6, wherein the temporarily-stored message is forwarded by the second component having the second temporary memory to said central unit at said second time point, said first time point preceding said second time point within said cycle time.

9. A computer program stored in a non-transitory computer-readable medium, said stored computer program being configured to be executed by an automated machine having central unit and a plurality of components, each component including at least one sensor and a motor module, the components having real-time communication links between each other, said computer program comprising:

program code configured to forward a message temporarily stored by a first component to a second component as real-time communication at a time point that is predetermined relative to the cycle time and provided to said first component in conjunction with a startup of the automated machine, said message being forwarded indirectly to said central unit using a temporary memory of said second component in the automated machine, program code configured to temporarily store messages received from said first component in said temporary memory of said second component, and program code configured to forward a message from said temporary memory in said second component to said central unit at a second time point that is predetermined relative to said cycle time and provided to said second component in conjunction with a startup of the automated machine.

10. The computer program of claim 9, further comprising program code configured to combine several messages that are stored by said temporary memory, and program code configured to forward the combined message at said second time point.

11. The computer program of claim 9, wherein the temporarily-stored message is forwarded by the second component having the second temporary memory to said central unit at said second time point, said first and second predetermined time points being centrally predetermined relative to the cycle time, said first time point preceding said second time point within said cycle time.

12. An automated machine, comprising:

a processing unit;

a plurality of components that are connected to ether in a network having a predetermined cycle time, each component including at least one sensor and a motor module, said components having real-time communication links between each other and a memory in which a computer program is stored as machine-readable program code that is configured to be executed by the processing unit, said computer program including program code configured to forward a message from a first component to a second component as real-time communication at a first time point that is predetermined relative to the cycle time and provided to said first component in conjunction with a startup of the automated machine, said message being forwarded either directly or Indirectly to a central unit in the automated machine, program code configured to temporarily store messages received from said first component in a second component that has a temporary memory, and program code configured to forward a message from the temporary memory in said second component to said central unit at a second time point that is predetermined relative to the cycle time and provided to said second component in conjunction with a startup of the automated machine.

13. The automated machine of claim 12, further comprising program code configured to combine several messages that are stored by said temporary memory, and program code configured to forward the combined message at said second time point.

14. The automated machine of claim 12, further comprising program code configured to forward the temporarily-stored message from said second component to said central unit, said first and second time points being centrally predetermined relative to the cycle time, said first time point preceding said second time point within said cycle time.

15. An automated machine, comprising:
 a plurality of components, each component including at least one sensor and a motor module;
 a processing unit; and
 firmware configured to execute an operating program in cooperation with the processing unit when the automated machine is operated, said firmware including:
  at least one logical device configured to forward a message from a first component to a second component as real-time communication during a respective cycle time at a first time point that is predetermined relative to the cycle time and provided to said first component in conjunction with a startup of the automated machine, said message being forwarded either directly or indirectly to a central unit in the automated machine,
  a logical device configured to temporarily store a message received from the first component in the second component, and
  a logical device configured to forward a message temporarily stored in the second component to said central unit at a second time point that is predetermined relative to the cycle time, said second time point being provided to said second component in conjunction with a startup of the automated machine.

16. The automated machine of claim 15, further comprising a logical device configured to combine several messages that are temporarily stored, and a logical device configured to forward the combined message at said second time point.

17. The automated machine of claim 15, further comprising:
 a logical device configured to forward a message from a component that temporarily stores messages to said central unit, said first and second time points being centrally predetermined relative to the cycle time, said first time point preceding said second time point within said cycle time.

* * * * *